United States Patent Office 3,567,769
Patented Mar. 2, 1971

3,567,769
SULFOBENZOYL HYDRAZIDES AND
SALTS THEREOF
Andre Girard and Andre Ray, Paris, France, assignors to
Roussel-UCLAF, Paris, France
No Drawing. Filed Dec. 20, 1967, Ser. No. 691,957
Claims priority, application France, Dec. 26, 1966,
88,827
Int. Cl. C07c *143/84*
U.S. Cl. 260—507                                4 Claims

ABSTRACT OF THE DISCLOSURE

This invention relates to a sulfobenzoyl hydrazide of the formula

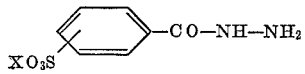

wherein the $SO_3X$ group is in the position selected from the group consisting of meta and para and X is selected from the group consisting of hydrogen, a metal cation and an organic base. The sulfobenzoyl hydrazides of the invention are useful in the preparation of hydrazones of aldehydes, ketones or quinones, which hydrazones in the form of their alkali metal salts are very soluble in water.

THE PRIOR ART

Of the possible hydrazides of the three sulfobenzoic acids, only the sulfohydrazides of meta-sulfobenzoic acid and of para-sulfobenzoic acid have been described, in which the COOH function remains free.

As this function is only weakly acid, these compounds are not well suited for dissolution of the corresponding carbonyl compounds in neutral or alkaline aqueous media.

OBJECTS OF THE INVENTION

An object of the present invention is the obtention of a sulfobenzoyl hydrazide of the formula

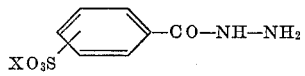

wherein the $SO_3X$ group is in the position selected from the group consisting of meta and para and X is selected from the group consisting of hydrogen, a metal cation and an organic base.

Another object of the present invention is the development of a process for the production of a sulfobenzoyl hydrazide of the formula

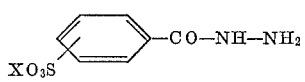

wherein the $SO_3X$ group is in the position selected from the group consisting of meta and para and X is selected from the group consisting of hydrogen, a metal cation and an organic base, which comprises the steps of esterifying the carboxylic acid group of a sulfobenzoic acid selected from the group consisting of meta-sulfobenzoic acid and para-sulfobenzoic acid with a primary alkanol while removing water from the reaction medium by azeotropic distillation, reacting the resulting ester selected from the group consisting of alkyl meta-sulfobenzoate and alkyl para-sulfobenzoate with a hydrazine compound selected from the group consisting of hydrazine, hydrazine hydrate and hydrazine weak acid addition salts in a neutral organic solvent medium, reacting the resultant salt selected from the group consisting of the hydrazine salt of meta-sulfobenzoyl hydrazide and the hydrazine salt of para-sulfobenzoyl hydrazide with an acid agent, and recovering said sulfobenzoyl hydrazide.

A further object of the present invention is the obtention of the novel intermediates:

(a) n-butyl meta-sulfobenzoate,
(b) n-butyl para-sulfobenzoate,
(c) the hydrazine salt of meta-sulfobenzoyl hydrazide,
(d) the hydrazine salt of para-sulfobenzoyl hydrazide.

These and other objects of the invention will become more apparent as the description thereof proceeds.

DESCRIPTION OF THE INVENTION

It has now been discovered that meta- or parasulfobenzoyl hydrazides having the general Formula I

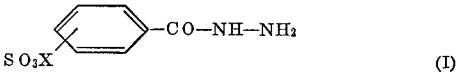
(I)

wherein X represents hydrogen, a metal cation or an organic base, combine very easily with most of aldehydes, ketones or possibly quinonic compounds to give hydrazones. The alkaline salts of these hydrazones are very soluble in water, and possess a good stability and may be used for therapeutic or industrial applications.

Accordingly, the novel compounds having the general Formula I are useful as intermediates in the synthesis of the meta- or para-sulfobenzoyl hydrazones having the general Formula II:

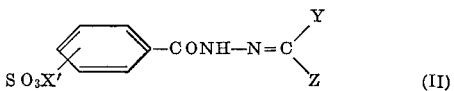
(II)

wherein X' is a metallic cation or an organic base, and Y is hydrogen, when the group=C—Z represents the remainder of an organic molecule possessing an aldehyde function or

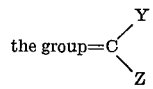

represents the remainder of an organic molecule possessing a ketone or quinone function.

Of the sulfobenzoyl hydrazones having the general Formula II, the tetracycline salt of the meta-sulfobenzoyl hydrazone of 5-nitro-furfuraldehyde may be mentioned. The salt acts on bacteria as bactericide and antibiotic.

Furthermore, these hydrazones may be used for isolating and/or purifying carbonyl derivatives, starting from their mixtures with neutral or weakly acid compounds, or starting from natural media. Thereafter the hydrazones are easily cleavable by action of strong acids.

The process for the preparation of the sulfobenzoyl hydrazones having the Formula II is the object of the invention described in our U.S. Patent Application Ser. No. 691,988, filed concurrently herewith, now abandoned. This process is indicated later on, only by way of illustration, by the description of the preparation of a hydrazone having the Formula II from a hydrazide having the general Formula I.

The process for the preparation of the sulfobenzoyl hydrazides of the general Formula I is shown by the flow diagram of Table A and comprises the selective esterification of the carboxylic acid function of the meta- or para-sulfobenzoic acid (A) by means of a primary aliphatic alcohol, while removing the water from the reaction medium by azeotropism as the reaction proceeds, reacting the resulting alkyl meta- or para-sulfobenzoate (III) with hydrazine or a derivative of hydrazine to obtain the hydrazine salt of the meta- or para-sulfobenzoyl hydrazide (IV), subjecting the latter to the action of an acid agent, isolating the desired meta- or para-sulfobenzoyl hydrazide (I, with X=H), which is possibly converted into a metallic salt or a salt of organic base.

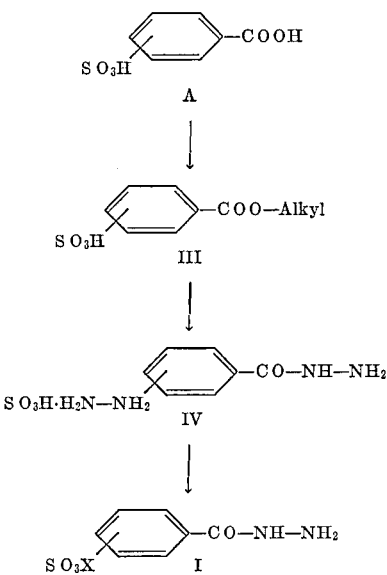

Moreover, the process of the invention includes the following points.

(1) The primary aliphatic alcohol used for the esterification of the meta- or para-sulfobenzoic acid is preferably a primary aliphatic alkanol which forms an azeotrope with water, such as butanol.

(2) The derivative of hydrazine, which is used to effect the conversion of the alkyl meta- or para-sulfobenzoate into hydrazine salt of the meta- or para-sulfobenzoyl hydrazide is a hydrazine compound selected from the group consisting of hydrazine, hydrazine hydrate and hydrazine salts with weak acids, preferably hydrazine hydrate. The reaction is effected in a substantially anhydrous solvent media under neutral reaction conditions at elevated temperature up to the boiling point of the reaction. Preferably the reaction media is a lower alkanol such as ethanol, methanol, or butanol.

(3) The conversion of the hydrazine salt of the meta- or para-sulfobenzoyl hydrazide into meta- or para-sulfobenzoyl hydrazide is effected by the action of strong acid, such as hydrochloric acid.

(4) The conversion of the hydrazine salt of the meta- or para-sulfobenzoyl hydrazide into meta- or para-sulfobenzoyl hydrazide is effected in aqueous medium, in which the internal salt formed by the meta- or para-sulfobenzoyl hydrazide is sparingly soluble.

For the preparation of the meta- or para-sulfobenzoic acids used as starting materials, the barium salts of these acids: $[(C_7H_5O_5S)_2Ba, 3H_2O]$, which may be easily purified by crystallization in water, are advantageously used.

The preparation of the barium salt of meta-sulfobenzoic acid is given, for example, by Ruggli et al. (Helv. 24, 203 [1941]), that of barium para-sulfobenzoate by Remsen (Ann. 178, 275–304 [1875]).

The meta- or para-sulfobenzoic acids are freed from their barium salts by adding sulfuric acid, in aqueous medium. After filtration to remove the barium sulfate, the meta- or para-sulfobenzoic acids are isolated by concentration of the filtrate to dryness under reduced pressure. The residue of distillation contains always an amount of water which is retained with firmness.

During the selective esterification of the carboxylic acid function by a primary aliphatic alcohol, the initially present water and the water which formed during the esterification are distilled off through a rectifying column. Propanol and especially butanol are particularly suitable for the water removal, because they form water-rich azeotropic mixtures.

The condensation of the ester with hydrazine is advantageously effected in an alcohol, such as ethanol or directly in the anhydrous butanolic solution, obtained after the esterification reaction.

The purification of the meta- or para-sulfonbenzoyl hydrazides may be effected by dissolution in ammoniacal water and precipitation by hydrochloric acid.

The eventual salification of the meta- or para-sulfobenzoyl hydrazide is effected by conventional methods. Weak acid salts of the desired metal or organic base are conveniently used.

The alkali metal salts, obtained, for example, in this way, such as lithium and sodium or the ammonium salts as well as salts of organic bases, such as ethanolamine, are readily soluble in water.

The following examples illustrate the invention. However, they are not to be deemed as limitative in any respect.

EXAMPLE 1

Meta-sulfobenzoyl hydrazide

Step A: Butyl meta-sulfobenzoate.—594 gm. (about 1 mol) of the trihydrated barium salt of metasulfobenzoic acid, prepared by the process described by Ruggli et al. (Helv. 24, 203 [1941]), are dissolved in the minimum amount of water and the theoretical quantity of sulfuric acid, which is necessary to liberate the meta-sulfobenzoic acid, is added. The barium sulfate formed is filtered off. Then the filtrate is concentrated under reduced pressure.

The residue is taken up in 1500 cc. of butyl alcohol and brought to boiling. The solution is slowly distilled while removing water by azeotropism. The distillaton is continued while again adding dry butanol, if necessary, until complete removal of the water occurs.

Then, the distillation is continued in vacuo in order to completely remove the butanol. As far as is known, butyl meta-sulfobenzoate is not described in the literature.

Step B: Meta-sulfobenzoyl hydrazide.—The dry residue is taken up with 500 cc. of ethanol. 250 gm. of hydrazine hydrate are added. Then the solution is heated to reflux on a water bath for three hours. The whole is distilled in vacuo to remove the alcohol and the excess hydrazine. The residue is taken up with 1500 cc. of water and acidified with hydrochloric acid. The m-sulfobenzoyl hydrazine crystallizes immediately. After cooling, it is vacuum filtered and washed with water. Yield: 92%.

The hydrazine hydrate may also be reacted with the butanolic solution of butyl meta-sulfobenzoate obtained in Step A.

Purification

The raw product obtained is purified by dissolution in water while adding a little excess of ammonium hydroxide solution, decolorized with charcoal and precipitated again with hydrochloric acid. The crystals are filtered after cooling in a refrigerator and washed with water, iced ethanol and ether.

The meta-sulfobenzoyl hydrazide occurs in the form of white needles without melting point and is soluble in boiling water at the rate of 33 gm./liter and 5 gm./liter in cold water, sparingly soluble in methanol and ethanol and insoluble in non-polar solvents. It gives salts in alkaline medium. These alkaline salts are very soluble in water, sparingly soluble in alcohols.

As far as is known, this compound is not described in the literature.

EXAMPLE 2

Para-sulfobenzoyl hydrazide

To obtain para-sulfobenzoyl hydrazide, one proceeds in a similar manner to that used for the preparation of the meta substituted derivative starting from barium salt of the para-sulfobenzoic acid $(C_7H_5O_5S)_2Ba, 3H_2O$, which is prepared by the process described by Remsen (Ann. 178, pp. 284, 288 [1875]).

The barium in the form of its sulfate is precipitated by sulfuric acid, and by concentration, parasulfobenzoic acid is isolated. The acid is dried at 130° C. and treated with butyl alcohol, and the water is eliminated by azeotropism, as in the case of the meta derivative. (For each 100 gm. of acid, 300 cc. of butanol are used.)

When the esterification is completed, the excess of alcohol is distilled off in vacuum and the butyl parasulfobenzoate is taken up with ethanol and hydrazine hydrate (130 cc. of ethanol and 64 gm. of hydrazine hydrate are used for the butyl para-sulfobenzoate derived from 100 gm. of meta-sulfobenzoic acid). The solution is heated to reflux for four hours and the purification is proceeded as in the case of the meta isomer. The parasulfobenzoyl hydrazide, is sparingly soluble in water (3.3 gm./liter in cold water).

As far as is known, butyl para-sulfobenzoate and para-sulfobenzoyl hydrazide are not described in the literature.

EXAMPLE 3

Application of the hydrazide of Example 1 to the preparation of the lithium salt of the meta-sulfobenzoyl hydrazone of 5-nitro-furfuraldehyde 22 gm. of meta-sulfobenzoyl hydrazide and 12 gm. of crystallized lithium acetate are admixed with 100 cc. of methanol containing 10% of water. The whole is dissolved by heating, filtered, cooled to about 20° C., and there are added 14.1 gm. of redistilled 5-nitro-furfural in a solution of 100 cc. of absolute methanol. The reaction mixture is left for three hours at 20° C. *in darkness*, then cooled in a refrigerator. The precipitate is vacuum filtered, washed with 150 cc. of iced methanol, then with ether, and dried in vacuo. 29 gm. of the desired lithium salt of the meta-sulfobenzoyl hydrazone of 5-nitro-furfuraldehyde are obtained.

At ordinary temperature this salt is soluble at the rate of 3% in water.

The corresponding alkali metal salts of the meta-sulfobenzoyl hydrazone of 5-nitro-furfuraldehyde can be produced by the same process utilizing the corresponding alkali metal acetate. Similarly, the alkali metal salts of the para-sulfobenzoyl hydrazone of 5-nitro-furfuraldehyde and, in particular, the lithium salt can be prepared analogously.

The preceding specific embodiments are illustrative of the practice of the invention. It is to be understood, however, that other expedients known to those skilled in the art may be employed without departing from the spirit of the invention or the scope of the appended claims.

We claim:
1. A sulfobenzoyl hydrazide of the formula

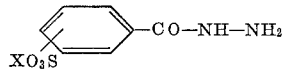

wherein the $SO_3X$ group is in the position selected from the group consisting of meta and para and X is selected from the group consisting of hydrogen, alkali metal, $-NH_4$, $-H.NH_2-NH_2$ and $H.NH_2CH_2CH_2OH$.

2. The compound of claim 1 wherein the $SO_3X$ group is in the meta position and X is hydrogen.

3. The compound of claim 1 wherein the $SO_3X$ group is in the para position and X is hydrogen.

4. A compound of the formula

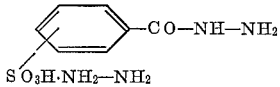

wherein the $SO_3H.NH_2-NH_2$ group is in the position selected from the group consisting of meta and para.

References Cited

UNITED STATES PATENTS

| | | | |
|---|---|---|---|
| 3,354,200 | 11/1967 | Huebner | 260—501.11 |
| 2,946,815 | 7/1960 | Hamor | 260—470 |
| 2,913,488 | 11/1959 | Blaser | 260—507 |
| 2,683,736 | 7/1954 | Kosmir | 260—470 |

LORRAINE A. WEINBERGER, Primary Examiner

E. J. GLEIMAN, Assistant Examiner

U.S. Cl. X.R.

260—240, 470, 501.12, 999